(12) United States Patent
Bacon et al.

(10) Patent No.: US 12,722,289 B2
(45) Date of Patent: Sep. 1, 2026

(54) MOBILE ROBOT INCLUDING A LIFT ASSEMBLY AND A LOW-PROFILE DRIVE MECHANISM

(71) Applicant: Herkules Equipment Corporation, Walled Lake, MI (US)

(72) Inventors: Todd John Bacon, Northville, MI (US); Eliana Virginia Podolski Bacon, Northville, MI (US)

(73) Assignee: Herkules Equipment Corporation, Walled Lake, MI (US)

( * ) Notice: Subject to any disclaimer, the term of this patent is extended or adjusted under 35 U.S.C. 154(b) by 647 days.

(21) Appl. No.: 18/204,268

(22) Filed: May 31, 2023

(65) Prior Publication Data

US 2023/0381955 A1 Nov. 30, 2023

Related U.S. Application Data

(60) Provisional application No. 63/347,290, filed on May 31, 2022, provisional application No. 63/347,333, (Continued)

(51) Int. Cl.

| | |
|---|---|
| ***B25J 9/16*** | (2006.01) |
| ***B25J 5/00*** | (2006.01) |

(Continued)

(52) U.S. Cl.

CPC ............... *B25J 9/162* (2013.01); *B25J 5/007* (2013.01); *B25J 9/102* (2013.01); *B25J 9/1697* (2013.01); *B25J 13/089* (2013.01)

(58) Field of Classification Search

CPC . B25J 9/162; B25J 9/102; B25J 9/1697; B25J 13/089; B25J 5/007

See application file for complete search history.

(56) References Cited

U.S. PATENT DOCUMENTS

| | | | |
|---|---|---|---|
| 907,176 | A | 12/1908 | Richardson |
| 1,882,069 | A | 10/1932 | Ekstromer |

(Continued)

FOREIGN PATENT DOCUMENTS

| | | | |
|---|---|---|---|
| CN | 211169687 | U | 8/2020 |
| EP | 1375410 | A1 | 1/2004 |

(Continued)

OTHER PUBLICATIONS

International Search Report for Application No. PCT/US2025/020251 dated Jul. 15, 2025, 2 pages.

(Continued)

*Primary Examiner* — Saul Rodriguez
*Assistant Examiner* — Ashley K Romano
(74) *Attorney, Agent, or Firm* — Howard & Howard Attorneys PLLC

(57) ABSTRACT

A mobile robot includes a lift assembly, a low-profile drive mechanism, and a plurality of wheels such that the mobile robot is moveable. The lift assembly includes a base and a platform moveable between a lowered state where the platform is proximal to the base and an elevated state where the platform is distal to the base. The low-profile drive mechanism includes a plurality of electric motors arranged in series along an axis to define an initial electric motor, one or more intermediate electric motors, and a final electric motor. The low-profile drive mechanism also includes a gear mounted to each of the electric motors and an output member driven by the gear mounted to the final electric motor to receive the combined rotational torque from the gears. The output member is coupled to the platform to move the platform between the lowered state and the elevated state.

22 Claims, 4 Drawing Sheets

Related U.S. Application Data filed on May 31, 2022, provisional application No. 63/347,311, filed on May 31, 2022.

(51) Int. Cl.

| | |
|---|---|
| ***B25J 9/10*** | (2006.01) |
| ***B25J 13/08*** | (2006.01) |

(56) References Cited

U.S. PATENT DOCUMENTS

| | | | | |
|---|---|---|---|---|
| 2,463,349 | A | 3/1949 | Baner | |
| 3,168,665 | A | 2/1965 | Holper | |
| 4,024,972 | A | 5/1977 | Hobson | |
| 4,457,403 | A | 7/1984 | Ream | |
| 7,461,722 | B2 * | 12/2008 | Kyotani | B66F 9/02 187/269 |
| 7,690,473 | B2 * | 4/2010 | Hammonds | B62D 33/063 180/326 |
| 7,731,013 | B2 * | 6/2010 | Milner | B62D 65/18 198/463.3 |
| 8,662,477 | B2 | 3/2014 | Bacon | |
| 8,708,089 | B2 | 4/2014 | Kitahata et al. | |
| 8,714,524 | B2 | 5/2014 | Bacon | |
| 8,733,508 | B2 | 5/2014 | Bacon | |
| 9,422,142 | B2 | 8/2016 | Bacon et al. | |
| 9,855,879 | B1 * | 1/2018 | Dack | B60P 3/14 |
| 9,938,126 | B2 * | 4/2018 | Ooe | B66F 7/0666 |
| 10,118,810 | B2 * | 11/2018 | Ahern | B66F 11/042 |
| 10,336,596 | B2 * | 7/2019 | Puszkiewicz | B66F 11/042 |
| 10,377,434 | B2 * | 8/2019 | Berghammer | B62D 63/062 |
| 10,499,730 | B2 * | 12/2019 | Kim | A47B 21/02 |
| 10,640,297 | B2 * | 5/2020 | Kilibarda | B65G 35/06 |
| 10,660,582 | B2 * | 5/2020 | Fortuna | A61B 6/508 |
| 10,986,918 | B2 * | 4/2021 | Xiang | A47B 23/043 |
| 11,491,645 | B2 * | 11/2022 | Asada | B25J 5/007 |
| 11,655,100 | B2 | 5/2023 | Scarth | |
| 12,358,767 | B2 * | 7/2025 | Bacon | B66F 7/065 |
| 2008/0101905 | A1 * | 5/2008 | Morris | A61G 5/104 414/540 |
| 2008/0169158 | A1 * | 7/2008 | Lam | B66F 7/14 187/211 |
| 2008/0224107 | A1 * | 9/2008 | Polins | E06B 5/01 254/45 |
| 2010/0012909 | A1 | 1/2010 | Lee | |
| 2011/0139548 | A1 * | 6/2011 | Bacon | B66F 7/065 254/338 |
| 2011/0139549 | A1 * | 6/2011 | Bacon | B66D 1/02 187/269 |
| 2014/0103277 | A1 | 4/2014 | Cormack | |
| 2023/0286793 | A1 | 9/2023 | Bafile | |
| 2023/0382698 | A1 | 11/2023 | Bacon et al. | |
| 2024/0084878 | A1 | 3/2024 | Bacon et al. | |
| 2025/0223141 | A1 | 7/2025 | Dahlberg et al. | |

FOREIGN PATENT DOCUMENTS

| | | | |
|---|---|---|---|
| GB | 764005 | A | 12/1956 |
| JP | H0946969 | A | 2/1997 |

OTHER PUBLICATIONS

English language abstract for CN 211169687 U extracted from espacenet.com database on Jul. 22, 2025, 1 page.
English language abstract for EP 1 375 410 A1extracted from espacenet.com database on Jul. 22, 2025, 1 page.
U.S. Appl. No. 18/204,280, filed May 31, 2023.
U.S. Appl. No. 18/204,290, filed May 31, 2023.
U.S. Appl. No. 63/347,311, filed May 31, 2022.
English language abstract for JPH 09-46969 A extracted from espacenet.com database on Aug. 14, 2024, 1 page.

* cited by examiner

MOBILE ROBOT INCLUDING A LIFT ASSEMBLY AND A LOW-PROFILE DRIVE MECHANISM

CROSS-REFERENCE TO RELATED APPLICATIONS

The subject patent application claims priority to and all the benefits of U.S. Provisional Patent Application No. 63/347,311, which was filed on May 31, 2022, claims priority to and all the benefits of U.S. Provisional Patent Application No. 63/347,333, which was filed on May 31, 2022, and claims priority to and all the benefits of U.S. Provisional Patent Application No. 63/347,290, which was filed on May 31, 2022, which are herein incorporated by reference in their entirety.

BACKGROUND OF THE INVENTION

1. Field of the Invention

The invention generally relates to a mobile robot including a lift assembly and a low-profile drive mechanism.

2. Description of the Related Art

Mobile lift assemblies typically have a base and a platform moveable relative to the base. The platform is commonly moved with a drive mechanism, which can be an electric motor. Often, significant weight is on the platform which necessitates the drive mechanism to be capable of generating significant power. However, mobile lift assemblies have spatial limitations in the environment in which they operate, which necessitates the drive mechanisms to be compact. One such spatial limitation is commonly height. However, drive mechanisms typically struggle to generate significant power when spatially limited in height. Moreover, some mobile lift assemblies are required to be manually positioned by an operator.

As such, there remains a need to provide an improved mobile robot including a lift assembly and a drive mechanism.

SUMMARY OF THE INVENTION AND ADVANTAGES

The present invention provides a mobile robot including a lift assembly, a low-profile drive mechanism, and a plurality of wheels coupled to the low-profile drive mechanism such that the mobile robot is movable. The lift assembly includes a base and a platform coupled to the base. The platform is moveable between a lowered state where the platform is proximal to the base and an elevated state where the platform is distal to the base. The low-profile drive mechanism includes a plurality of electric motors arranged in series along an axis to define an initial electric motor, one or more intermediate electric motors, and a final electric motor. The low-profile drive mechanism also includes a gear mounted to each of the electric motors and an output member driven by the gear mounted to the final electric motor to receive the combined rotational torque from the gears mounted to the electric motors. The output member is coupled to the platform to move the platform between the lowered state and the elevated state.

In the preferred embodiment as shown, the plurality of electric motors arranged in series permits the rotational torque from the gears to be combined. The combined rotational torque from the gears of the series of electric motors is then transferred from the gear of the final electric motor to drive the output member. The series arrangement of the plurality of electric motors lowers the profile of the drive mechanism while still being capable of generating significant power due to the rotational torque from the gears being combined. As such, the mobile robot is able to be positioned underneath a object to be lifted, and the platform of the lift assembly is able to support significant weight when moving between the lowered state and the elevated state.

There has thus been outlined, rather broadly, certain features of embodiments of the invention in order that the detailed descriptions thereof may be better understood, and in order that the present contribution to the art may be better appreciated. Additional or alternative features of embodiments of the invention are described in further detail below.

In this respect, before explaining embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

To accomplish the above and related objects, the invention may be embodied in the forms illustrated in the accompanying drawings, attention being called to the fact, however, that the drawings are illustrative only, and that changes may be made in the specific constructions illustrated. Moreover, it is to be noted that the accompanying drawings are not necessarily drawn to scale or to the same scale. In particular, the scale of some of the elements of the drawings may be exaggerated to emphasize characteristics of the elements.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 1:
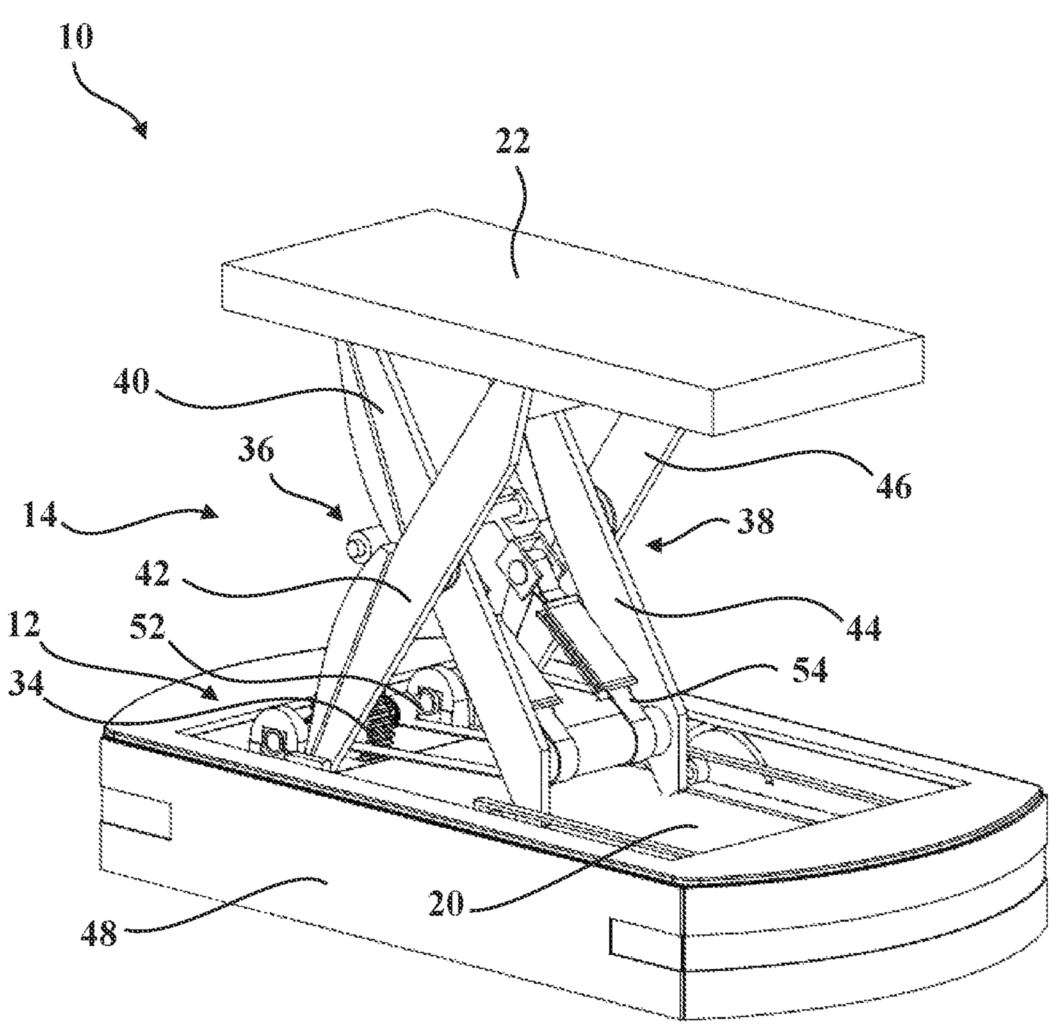
FIG. 1 is a perspective view of the mobile robot including the low-profile drive mechanism.
Figure 2:
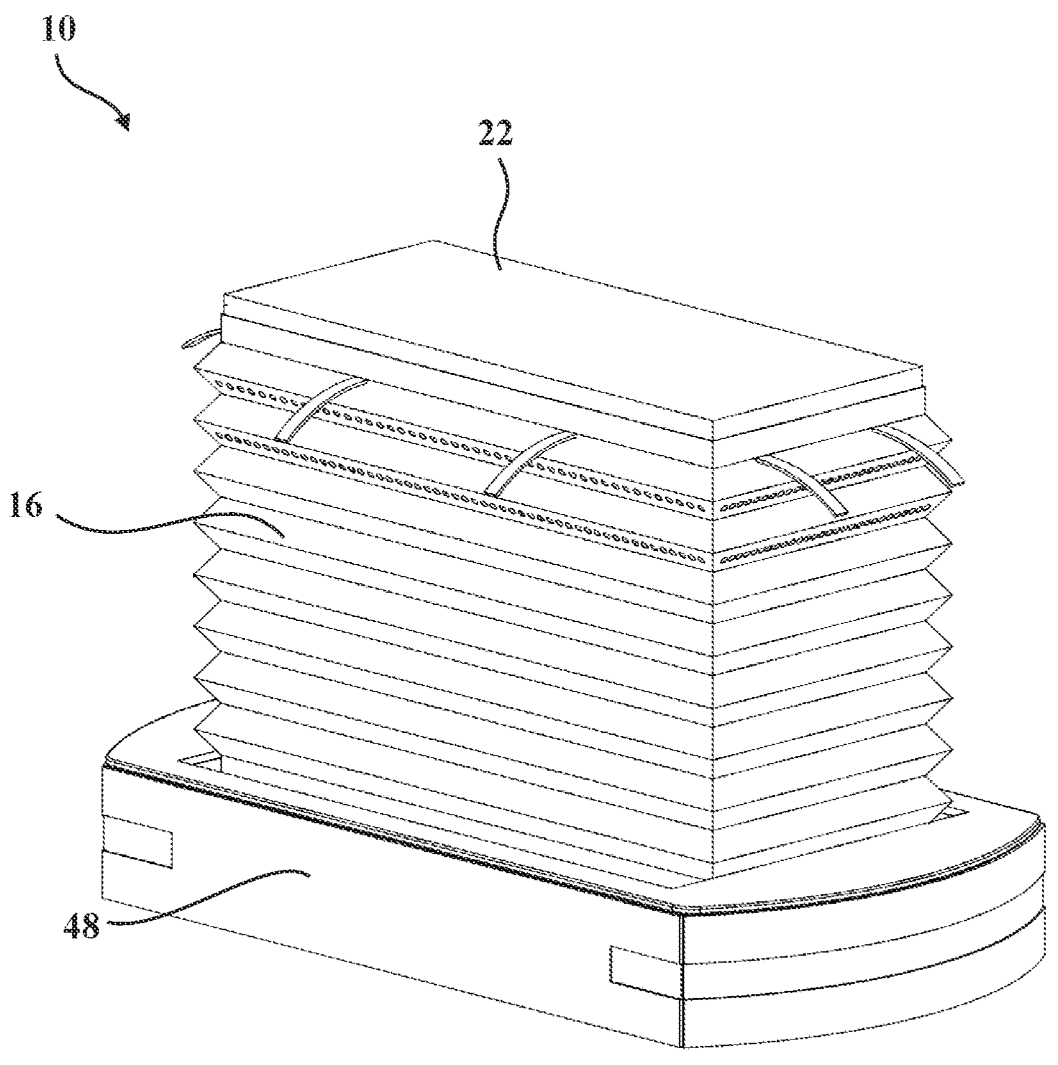
FIG. 2 is a perspective view of the mobile robot including the low-profile drive mechanism of FIG. 1, with the lift assembly enclosed by a skirt.
Figure 3:
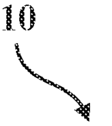
FIG. 3 is a perspective view of the mobile robot including the low-profile drive mechanism in a lowered state.
Figure 3:
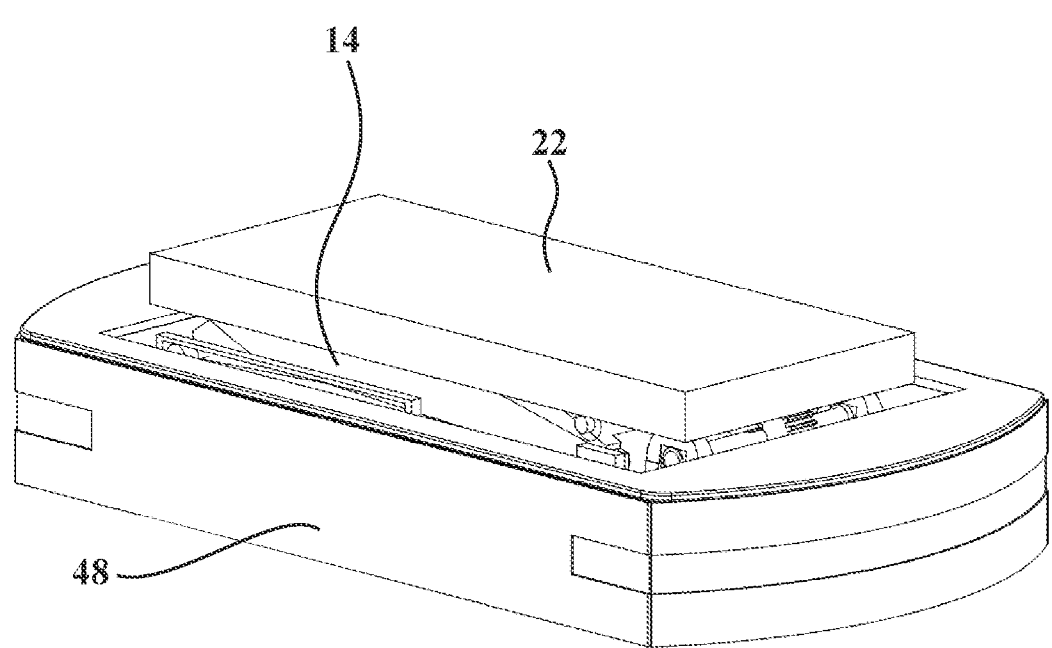
Figure 4:
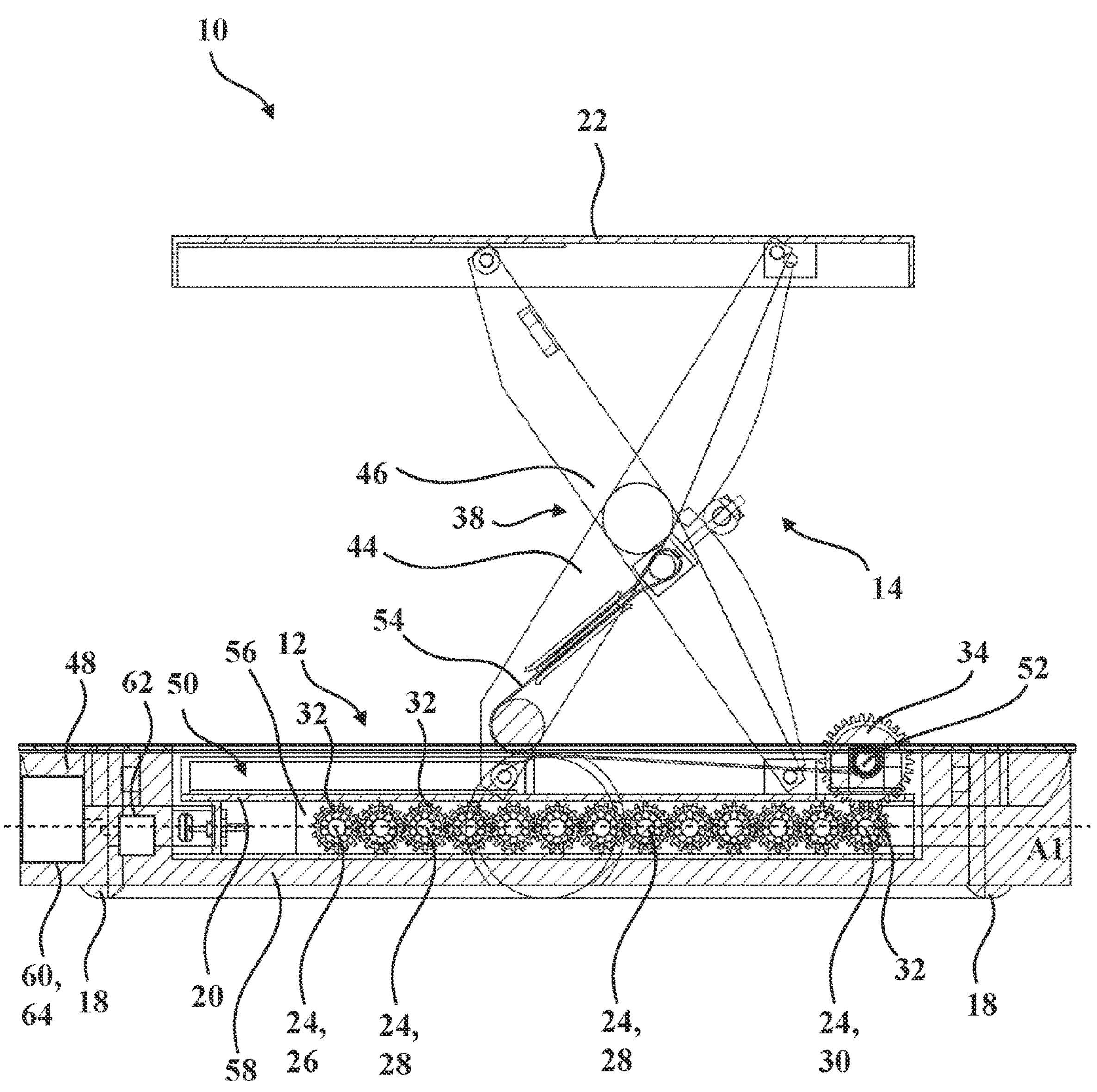
FIG. 4 is a cross-sectional view of the mobile robot including the low-profile drive mechanism.

With reference to the Figures, wherein like numerals indicate like parts throughout the several views, a mobile robot 10 includes a lift assembly 14, a low-profile drive mechanism 12, and a plurality of wheels 18 coupled to the low-profile drive mechanism 12 such that the mobile robot 10 is movable. The lift assembly 14 includes a base 20 and a platform 22 coupled to the base 20. The platform 22 is moveable between a lowered state where the platform 22 is proximal to the base 20, as shown in FIG. 3, and an elevated state where the platform 22 is distal to the base 20, as shown in FIGS. 1, 2, and 4. The low-profile drive mechanism 12 includes a plurality of electric motors 24 arranged in series along an axis A1 to define an initial electric motor 26, one or more intermediate electric motors 28, and a final electric motor 30. The low-profile drive mechanism 12 also includes a gear 32 mounted to each of the electric motors 24 and an output member 34 driven by the gear 32 mounted to the final electric motor 30 to receive the combined rotational torque from the gears 32 mounted to the electric motors 24. The output member 34 is coupled to the platform 22 to move the platform 22 between the lowered state and the elevated state.

The plurality of electric motors 24 arranged in series permits the rotational torque from the gears 32 to be combined. The combined rotational torque from the gears 32 of the series of electric motors 24 is then transferred from the gear 32 of the final electric motor 30 to drive the output member 34. The series arrangement of the plurality of electric motors 24 lowers the profile of the drive mechanism 12 while still being capable of generating significant power due to the rotational torque from the gears 32 being combined. As such, the mobile robot can be positioned underneath an object to be lifted, and the platform 22 of the lift assembly 14 is able to support significant weight when moving between the lowered state and the elevated state.

The lift assembly 14 may further include a first pair of scissor arms 36 and a second pair of scissor arms 38. The first pair of scissor arms 36 includes a first arm 40 coupled to the platform 22 and to the base 20, and a second arm 42 coupled to the platform 22 and to the base 20. The first arm 40 and the second arm 42 are pivotably connected to one another. The second pair of scissor arms 38 includes a third arm 44 coupled to the platform 22 and to the base and a fourth arm 46 coupled to the platform 22 and to the base 20. The third arm 44 and the fourth arm 46 are pivotably connected to one another.

The mobile robot 10 may also further include a skirt 16 disposed about the first pair of scissor arms 36 and the second pair of scissor arms 38. The skirt 16 both protects the first pair of scissor arms 36 and the second pair of scissor arms 38 from damage from nearby objects and contaminants and protects an operator from injury relating to contacting the lift assembly 14 during the movement of the first pair of scissor arms 36 and the second pair of scissor arms 38. Moreover, the skirt 16 may prevent ingress of contaminants such as dust and other particles which could affect the performance of the lift assembly 14. As such, the skirt 16 may be referred to as a safety skirt.

The mobile robot 10 may further include a housing 48 defining a cavity 50. The plurality of electric motors 24 and gears 32 may be disposed in the cavity 50. The housing 48 thus both protects the plurality of electric motors 24 and gears 32 from damage from nearby objects and contaminants and protects an operator from injury relating to movement of the plurality of electric motors 24 and gears 32. Moreover, the skirt 16 may extend between the platform 22 and the housing 48. As such, it is to be appreciated that the lift assembly 14 and the drive mechanism 12 may be enclosed by the skirt 16 and the housing 48.

The skirt 16 may include corrugations (e.g., is shaped as a bellow). As such, the skirt 16 may be collapsible. More specifically, the corrugations may collapse upon themselves as the platform 22 moves between the elevated state and the lowered state. It is to be appreciated that the skirt 16 may be enclosed by the platform 22 and the housing 48 when the platform 22 is in the lowered state.

The output member 34 and the gear 32 of the final electric motor 30 may establish a gear reduction therebetween. As such, although not required, the rotational connection between the output member 34 and the gear 32 of the final electric motor 30 may be the only gear reduction in the drive mechanism 12. Moreover, the rotational torque provided to the output member 34 may be exclusively provided by the gear 32 mounted to the final electric motor 30. Moreover, although not required, each of the gears 32 may be sized such that a gear reduction is not established between any of the plurality of gears 32.

The plurality of electric motors 24 and the gears 32 are each rotatable about a rotational axis. The rotational axes may be aligned along a common plane. The output member 34 may be rotatable about a rotational axis, and the rotational axis of the output member 34 may be offset from the common plane. However, it is to be appreciated that the rotational axis of the output member 34 may be aligned with the common plane. The gears 32 may be in meshed relation with one another. In other words, each of the plurality of gears 32 may be in contact with at least one adjacent gear 32. Moreover, the gear 32 mounted to the final electric motor 30 may be in meshed relation with the output member 34.

The mobile robot 10 may further include an output shaft 52 rotationally fixed to the output member 34 to position the output member 34 for engagement with the gear 32 of the final electric motor 30. The low-profile drive mechanism 12 may be configured to exert high torque at low rotations per minute (RPM) of the output shaft 52 and/or the gears 32. For example, when integrated into the lift assembly, the low-profile drive mechanism 12 may exert sufficient torque to lift thousands of pounds. As non-limiting examples, the plurality of electric motors 24 and the gears 32 may be together configured to rotate the output shaft 52 between 1 RPM and 50 RPM, between 5 RPM and 40 RPM, between 10 RPM and 30 RPM, between 10 RPM and 20 RPM, and may be approximately 15 RPM. Such low rotations per minute of the output shaft 52 prevents binding of the gears 32, which may otherwise be expected from such an arrangement.

Moreover, the electric motors 24 arranged in series along the axis A1 do not present any electric and magnetic field concerns that would prevent the electric motors 24 from successful operation. More specifically, because the energy usage of each electric motor 24 is relatively low, the total flux generated by each electric motor 24 is insufficient to cause malfunction of adjacent electric motor(s) 24. Therefore, the electric motors 24 may be arranged in series relatively closely along the axis A1. For example, a gap may be defined between adjacent electric motors 24 along the axis A1. The gap may be between 0.1 inches and 3 inches, may be between 0.25 inches and 2 inches, may be between 0.25 inches and 1.5 inches, may be between 0.25 inches and 1.25 inches, and may be between 0.25 inches and 1 inch.

The mobile robot 10 may further include an output belt 54 fixed to the output shaft 52. The output belt 54 is configured to be wound about the output shaft 52 upon rotation of the gears 32. The output belt 54 is also coupled to the lift assembly 14 to move the platform 22 between the lowered state and the elevated state. The low-profile drive mechanism 12 may further include a mount block 56 extending along an axis A1. The mount block 56 supports the plurality of electric motors 24.

The low-profile drive mechanism 12 is designed to be low to the ground, as shown in FIG. 4. Thus, the mobile robot 10 including the low-profile drive mechanism 12 is also designed to be low to the ground. In non-limiting examples, the height of the low-profile drive mechanism 12 may be between about 5 inches and about 14 inches, may be between about 7 inches and about 12 inches, may be between about 8 inches and about 12 inches, may be between about 9 inches and about 11 inches, and may be about 10 inches. In a non-limiting example, a prototype manufactured was limited in height to about 10.3 inches. Depending upon end use, minimizing the height of the low-profile drive mechanism 12 may advantageously permit the low-profile drive mechanism 12 to operate in confined spaces, potentially generating a meaningful impact on performance of the low-profile drive mechanism 12. The drive system 48 may include the drive mechanism of U.S. Provisional Patent Application No. 63/347,311, which was filed on May 31, 2022, and U.S. patent application Ser. No. 18/204,280 filed concurrently herewith on May 31, 2023, now U.S. Pat. No. 12,358,767, both of which are incorporated by reference in their entirety.

The mobile robot 10 may further include a base support 58 extending along the axis A1. The mount block 56 may be supported by the base support 58. Moreover, a height between the base support 58 and the output member 34 may be between about 5 inches and about 14 inches, may be between about 7 inches and about 12 inches, may be between about 8 inches and about 12 inches, may be between about 9 inches and about 11 inches, and may be about 10 inches.

The mobile robot 10 may further include at least one sensor 60 to detect a position of the mobile robot 10. The mobile robot 10 may further include a control system 62 to receive at least one signal from the at least one sensor 60 and, based upon the at least one signal move the wheels 18 to navigate the mobile robot 10.

The mobile robot 10 may be powered through either alternative current or direct current. The mobile robot 10 may also be further defined as an automated guided vehicle (AGV) 10, also referred to as an autonomous mobile robot (AMR). The automated guided vehicle may be configured to follow along marked lines or wires on a floor, may use radio waves, may use vision cameras, may use magnets, and/or may use lasers for navigation. The at least one sensor may be further defined as at least one vision camera 64. The at least one vision camera 64 may be configured to detect marked lines on a floor. The automated guided vehicle 10 may be used to transport heavy materials around a large industrial building, such as a factory or a warehouse. It is to be appreciated that the sensor 60, control system 62, and vision camera 64 may be of any suitable type or configuration as known to those skilled in the art. For illustrative purposes, these components are shown schematically.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A mobile robot comprising;
- a lift assembly including,
  - a base, and
  - a platform coupled to said base, said platform moveable between a lowered state where said platform is proximal to said base and an elevated state where said platform is distal to said base;
- a low-profile drive mechanism including,
  - a plurality of electric motors arranged in series along an axis to define an initial electric motor, one or more intermediate electric motors, and a final electric motor,
  - a gear mounted to each of said electric motors, and
  - an output member driven by said gear mounted to said final electric motor to receive the combined rotational torque from said gears mounted to said electric motors, with said output member coupled to said platform to move said platform between said lowered state and said elevated state; and
- a plurality of wheels coupled to said low-profile drive mechanism such that said mobile robot is moveable.

2. The mobile robot of claim 1, wherein said lift assembly further includes:
- a first pair of scissor arms including a first arm coupled to said platform and to said base and a second arm coupled to said platform and to said base, with said first arm and said second arm pivotably connected to one another; and
- a second pair of scissor arms including a third arm coupled to said platform and to said base and a fourth arm coupled to said platform and to said base, with said third arm and said fourth arm pivotably connected to one another.

3. The mobile robot of claim 2 further comprising a skirt disposed about said first pair of scissor arms and said second pair of scissor arms.

4. The mobile robot of claim 3 further comprising a housing defining a cavity, with said plurality of electric motors and gears disposed in said cavity, wherein said skirt extends between said platform and said housing.

5. The mobile robot of claim 3, wherein said skirt includes corrugations.

6. The mobile robot of claim 3, wherein said skirt is collapsible.

7. The mobile robot of claim 1 further comprising a housing defining a cavity, with said plurality of electric motors and gears disposed in said cavity.

8. The mobile robot of claim 1, wherein said output member and said gear of said final electric motor establish a gear reduction therebetween.

9. The mobile robot of claim 1, wherein said rotational torque provided to said output member is exclusively provided by said gear mounted to said final electric motor.

10. The mobile robot of claim 1, wherein each of said gears is sized such that a gear reduction is not established between any of the plurality of gears.

11. The mobile robot of claim 1, wherein said plurality of electric motors and said gears are each rotatable about a rotational axis, with said rotational axes aligned along a common plane.

12. The mobile robot of claim 11, wherein said output member is rotatable about a rotational axis, and wherein said rotational axis of said output member is offset from said common plane.

13. The mobile robot of claim 1, wherein said gears are in meshed relation with one another.

14. The mobile robot of claim 1 wherein said gear mounted to said final electric motor is in meshed relation with said output member.

15. The mobile robot of claim 1 further comprising an output shaft rotationally fixed to said output member to position said output member for engagement with said gear of said final electric motor.

16. The mobile robot of claim 15 further comprising an output belt fixed to said output shaft and configured to be wound about said output shaft upon rotation of said gears, wherein said output belt is coupled to said lift assembly to move said platform between said lowered and elevated states.

17. The mobile robot of claim 1, wherein said low-profile drive mechanism further includes a mount block extending along an axis and supporting said plurality of electric motors.

18. The mobile robot of claim 17 further comprising a base support extending along said axis, wherein said mount block is supported by said base support, and wherein a height between said base support and said output member is between about 5 inches and about 14 inches.

19. The mobile robot of claim 1 further comprising at least one sensor to detect a position of the mobile robot.

20. The mobile robot of claim 19 further comprising a control system to receive at least one signal from said at least one sensor and, based upon said at least one signal, move said wheels to navigate said mobile robot.

21. The mobile robot of claim 19, wherein said at least one sensor is further defined as at least one vision camera.

22. The mobile robot of claim 21, wherein said at least one vision camera is configured to detect marked lines on a floor.

* * * * *